(12) United States Patent
Kerboua et al.

(10) Patent No.: US 6,602,551 B2
(45) Date of Patent: Aug. 5, 2003

(54) CURABLE SILICONE ADHESIVE COMPOSITIONS

(75) Inventors: Rachid Kerboua, Schenectady, NY (US); Judith Stein, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/897,238

(22) Filed: Jul. 2, 2001

(65) Prior Publication Data

US 2003/0049465 A1 Mar. 13, 2003

(51) Int. Cl.$^7$ .................................................. B05D 1/00
(52) U.S. Cl. .................... 427/387; 524/323; 524/334; 524/588; 525/478; 528/12; 549/512; 568/723; 568/716; 428/474.4; 428/447
(58) Field of Search ................... 524/323, 334, 524/588; 525/478; 528/12; 549/512; 568/723, 716; 428/474.4, 447; 427/387

(56) References Cited

U.S. PATENT DOCUMENTS 3,931,267 A * 1/1976 Brode
4,379,824 A * 4/1983 Collins
5,438,094 A   8/1995 Fujiki et al.
5,723,636 A * 3/1998 Fenelli et al.
2001/0004650 A1 * 6/2001 Tsuji et al.

FOREIGN PATENT DOCUMENTS

EP   1035162   9/2000

* cited by examiner

Primary Examiner—Robert Dawson
Assistant Examiner—Kuo-Liang Peng
(74) Attorney, Agent, or Firm—Benadette M. Bennett; Noreen C. Johnson

(57) ABSTRACT

A silicone composition is provided which comprises a vulcanizable adhesive formulation which comprises at least one oxygen-substituted allyl aromatic compound, a vinyl-containing polydiorganosiloxane, a hydrogen-containing polysiloxane, and a catalytic amount of a hydrosilylation catalyst. Further embodiments of the present invention include the oxygen-substituted allyl aromatic compound which provides adhesion to a substrate when present in a silicone composition and a method to provide cohesive failure to a silicone composition and a polyamide substrate.

28 Claims, No Drawings

CURABLE SILICONE ADHESIVE COMPOSITIONS

STATEMENT REGARDING FEDERALLY SPONSORED RESEARCH & DEVELOPMENT

The government has rights in this invention pursuant to Contract No. DAAE3099C1042 awarded by SERDP.

BACKGROUND OF THE INVENTION

The present invention is related to curable silicone compositions. More specifically, the present invention is related to vulcanizable adhesive formulations which provide adhesion to substrates.

Curable silicone compositions are used as laminates over a variety of substrates and in a wide variety of applications. In order to impart self-bonding adhesive properties to the silicone composition such that a primer is not needed between the silicone composition and a substrate, adhesion promoters in the silicone composition are commonly used.

Mitchell et al., U.S. Pat. No. 5,164,461, discuss an addition-curable silicone composition which includes a vinyl-containing polydiorganosiloxane, a hydrogen-terminated polysiloxane, and an adhesion promoter. The adhesion promoters include silylmaleates, silylmaleimides and silylfumarates. The silicone composition is useful for self-bonding to substrates such as plastics, metals, and glass at a cure temperature in a range between about 100° C. and about 150° C. The silicone composition disclosed has both excellent physical properties and excellent lap shear adhesive properties.

Stein et al., U.S. Pat. No. 5,414,066, is directed to a room-temperature addition-curable silicone adhesive composition which incorporates N-heterocyclic silanes as the adhesion promoter. The addition of the N-heterocyclic silane to a vinyl-containing polydiorganosiloxane and a hydrogen-terminated polysiloxane provides a silicone adhesive composition which cures at room temperature. The composition is directed to providing adhesion to substrates such as glass, plastics and metals.

Although silicone adhesive compositions have been developed which provide adhesion to plastic substrates, silicone adhesive compositions with new adhesion promoters are constantly being sought which include desired physical properties.

BRIEF SUMMARY OF THE INVENTION

The present invention relates to a silicone composition which comprises a vulcanizable adhesive formulation which comprises:

(A) at least one oxygen-substituted allyl aromatic compound,
(B) a vinyl-containing polydiorganosiloxane,
(C) a hydrogen-containing polysiloxane,
(D) a catalytic amount of a hydrosilylation catalyst, and
(E) an inhibitor.

A further embodiment of the present invention is a method to provide cohesive failure to a silicone composition and a substrate which comprises the steps of:

(I) applying a silicone composition to a substrate wherein the silicone composition comprises:
(A) at least one oxygen-substituted allyl aromatic compound,
(B) a vinyl-containing polydiorganosiloxane,
(C) a hydrogen-containing polysiloxane,
(D) a catalytic amount of a hydrosilylation catalyst, and
(E) an inhibitor.
(II) curing the silicone composition.

A further embodiment of the present invention provides an oxygen-substituted allyl aromatic compound having a formula (I)

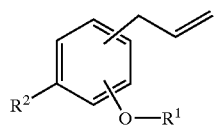

(I)

wherein each $R^1$ independently represents hydrogen or epoxy; $R^2$ represents hydrogen or group II with the proviso that $R^1$ is epoxy when $R^2$ is hydrogen, said group II having the structural formula

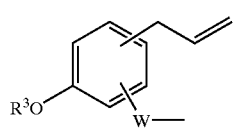

(II)

wherein $R^3$ represent hydrogen or epoxy; and W is a group having the structural formula

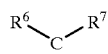

wherein $R^6$ and $R^7$ are independently at each occurrence, hydrogen, a perfluoroalkyl, a $C_1$–$C_{20}$ alkyl radical, a $C_4$–$C_{20}$ cycloalkyl radical, or a $C_4$–$C_{20}$ aryl radical or together, $R^6$ and $R^7$ form a $C_4$–$C_{20}$ cycloaliphatic ring which is optionally substituted by one or more $C_1$–$C_{20}$ alkyl radicals, $C_6$–$C_{20}$ aryl radicals, $C_5$–$C_{21}$ aralkyl radicals, $C_5$–$C_{20}$ cycloalkyl groups, or combination thereof;

wherein the oxygen-substituted allyl aromatic compound provides adhesion to a substrate when present in a silicone composition.

DETAILED DESCRIPTION OF THE INVENTION

It has been found that the incorporation of an effective amount of allyl aromatic compound as an adhesion promoter into silicone compositions provides an adhesive formulation which adheres to thermoplastic substrates. An "effective amount of allyl aromatic compound" as used herein is an amount of the adhesion promoter which promotes adhesion to thermoplastic substrates. Typically, the amount of adhesion promoter is in a range between about 0.1% by weight and about 5% by weight of the total adhesive formulation, herein referred to as "total composition" or "silicone composition".

The adhesion promoter is (A) at least one oxygen-substituted allyl aromatic compound which usually has the general formula (I):

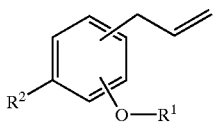
(I)

wherein each $R^1$ independently represents hydrogen or epoxy; $R^2$ represents hydrogen or group II with the proviso that $R^1$ is epoxy when $R^2$ is hydrogen, said group II having the structural formula

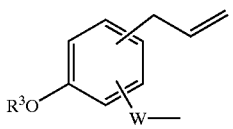
(II)

wherein $R^3$ represent hydrogen or epoxy, and W is the group having the structural formula

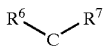

wherein $R^6$ and $R^7$ are independently at each occurrence, hydrogen, a perfluoroalkyl, a $C_1$–$C_{20}$ alkyl radical, a $C_4$–$C_{20}$ cycloalkyl radical, or a $C_4$–$C_{20}$ aryl radical or together, $R^6$ and $R^7$ form a $C_4$–$C_{20}$ cycloaliphatic ring which is optionally substituted by one or more $C_1$–$C_{20}$ alkyl radicals, $C_6$–$C_{20}$ aryl radicals, $C_5$–$C_{21}$ aralkyl radicals, $C_5$–$C_{20}$ cycloalkyl groups, or combination thereof. The term "alkyl radical" is intended to designate both normal alkyl and branched alkyl radicals. Normal and branched alkyl radicals are preferably those containing carbon atoms in a range between about 1 and about 20, and include as illustrative non-limiting examples methyl, ethyl, propyl, isopropyl, butyl, tertiary-butyl, pentyl, neopentyl, hexyl, octyl, decyl, dodecyl. Aryl radicals include examples such as phenyl and tolyl. Cycloalkyl radicals represented are preferably those containing ring carbon atoms in a range between about 4 and about 20. Some illustrative non-limiting examples of these cycloalkyl radicals include cyclobutyl, cyclopentyl, cyclohexyl, methylcyclohexyl, and cycloheptyl. Preferred aralkyl radicals are those containing carbon atoms in a range between about 5 and about 21; these include, but are not limited to, benzyl, phenylbutyl, phenylpropyl, and phenylethyl. Most preferably, an oxygen-substituted allyl aromatic compound is used as the adhesion promoter wherein $R^2$ comprises Group II; $R^1$ is hydrogen; $R^3$ is hydrogen; and W is the group having the structural formula

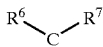

wherein $R^6$ and $R^7$ are $C_1$ alkyl radicals.

In addition to the effective amount of at least one oxygen-substituted allyl aromatic compound (A), the vulcanizable adhesive formulation includes (B) a vinyl-containing polydiorganosiloxane,
(C) a hydrogen-containing polysiloxane,
(D) a catalytic amount of a hydrosilylation catalyst, and
(E) an inhibitor.

The vinyl-containing polydiorganosiloxane has the general formula (III),

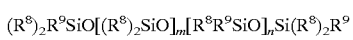
(III)

wherein $R^9$ is an ethylenic unsaturated radical, preferably vinyl; $R^8$ is selected from the group consisting of $C_{1-8}$ alkyl radicals, phenyl radicals, and $C_{3-10}$ fluoroalkyl radicals and mixtures thereof, "m"+"n" has a value sufficient to provide a total vinyl-containing composition with a viscosity in a range between about 100 centipoise and about 100,000 centipoise at 25° C., and preferably, in a range between about 3000 centipoise and about 95,000 centipoise at 25° C. and a vinyl content in a range between about 0.02% by weight and about 2.0% by weight of the vinyl-containing polydiorganosiloxane. Radicals represented by $R^8$ are preferably $C_{1-4}$ alkyl radicals and more preferably, methyl. Typically, the vinyl-containing polydiorganosiloxane is present in a range between about 10% by weight and about 80% by weight of the total composition.

The vinyl-containing polydiorganosiloxane (B) includes (1) the vinyl-containing polydiorganosiloxane and may also include (2) a vinyl-containing siloxane resin copolymer.

The vinyl-containing siloxane resin copolymer is present in a range between about 0% by weight and about 70% by weight of the total vinyl-containing polydiorganosiloxane having $(R^{10})_3SiO_{1/2}$units ("$M$") and $SiO_{4/2}$units ("$Q$"), wherein $R^{10}$ is a vinyl radical, or a monovalent hydrocarbon radical free of aliphatic unsaturation and containing no more than six carbon atoms, the ratio of $(R^{10})_3SiO_{1/2}$ units to $SiO_{4/2}$ units being in a range between about 0.5:1 and about 1.5:1, and the resin having a vinyl content in a range between about 1.5% by weight and about 3.5% by weight of the vinyl-containing siloxane resin copolymer. The vinyl-containing siloxane resin copolymer is also referred to as the "vinyl-containing MQ resin" or "$M^{Vi}Q$".

The vinyl-containing siloxane resin copolymer may further contain (i) $R^{10}SiO_{3/2}$ units ("T"), (ii) $(R^{10})_2SiO_{2/2}$ units ("D"), or combinations thereof, where the $(R^{10})_2SiO_{2/2}$ units are present in an amount in a range between about 0 mole percent and about 10 mole percent based on the total number of moles of siloxane units in the vinyl-containing siloxane resin copolymer and $R^{10}$ is as defined above.

The hydrogen-containing polysiloxane (C) functions as a cross-linking agent and is typically present in a range between about 1% by weight and about 15% by weight of the total composition. The hydrogen-containing polysiloxane is represented by an average unit formula (IV), $$R^{11}_d H_e SiO_{(4-d-e)/2} \tag{IV}$$

wherein $R^{11}$ is hydrogen, a monovalent hydrocarbon radical, or halogenated monovalent hydrocarbon radical having carbon atoms in a range between about 1 and about 10, and free of aliphatic unsaturation, "d" has a value in a range between 0 and about 3, "e" has a value in a range between about 1 and about 3, and the sum of "d"+"e" has a value in a range between about 1 and about 3. $R^{11}$ is preferably selected from $C_{1-8}$ alkyl radicals, phenyl, $C_{3-10}$ fluoroalkyl radicals, and hydrogen and most preferably, methyl. Most typically, the preferred fluoroalkyl radical is trifluoropropyl.

A preferred hydrogen-containing polysiloxane has the formula (V)

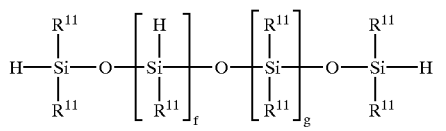

(V)

where $R^{11}$ is as defined above, "f" and "g" have values which are sufficient when added together to provide a viscosity in a range between about 10 centipoise and about 1000 centipoise at 25° C., and preferably, in a range between about 10 centipoise and about 150 centipoise at 25° C., and the reactive hydrogen content is in a range between about 0.02% by weight and about 1.6% by weight of the hydrogen-containing polysiloxane. The hydrogen-containing polysiloxane of formula (V) can be used as a hydride cross-linking agent in the present invention.

Other hydrogen-containing polysiloxanes which can be used in the present invention include siloxane copolymer resins comprised of "M" units which comprise $(R^{11})_3SiO_{1/2}$, "$M^H$" units which comprise $H(R^{11})_2SiO_{1/2}$, "D" units which comprise $(R^{11})_2SiO_{2/2}$, "$D^H$" units which comprise $HR^{11}SiO_{2/2}$, "T" units which comprise $R^{11}SiO_{3/2}$, "$T^H$" units which comprise $HSiO_{3/2}$, and "Q" units, and mixtures thereof wherein the mixtures comprise at least one hydrogen. The preferred resins are known as $M^H Q$ resins, which comprise diorganohydrogensiloxy units ($M^H$) and $SiO_{4/2}$ units (Q) wherein the ratio of diorganohydrogensiloxy units to Q units is in a range between about 0.4:1.0 and about 2.0:1.0 inclusive. Hydrogen-containing polysiloxanes having at least one $R^{11}$ group, preferably, a methyl group, bonded to silicon which bears at least one reactive hydrogen atom are preferred. It is understood that the hydrogen-containing polysiloxane can be a single compound or a mixture of compounds. Additional hydrogen-containing polysiloxanes suitable for use in the present invention are described, for example, in U.S. Pat. No. 4,061,609.

The adhesive formulation further contains a catalytic amount of a hydrosilylation catalyst (D). The hydrosilylation catalyst (D) promotes the hydrosilylation reaction. The hydrosilylation catalyst (D) typically is a platinum group metal catalyst. Additional catalysts for facilitating the hydrosilylation curing reaction include precious metal catalysts such as those containing ruthenium, rhodium, palladium, osmium, or iridium, or complexes of these metals. Examples of suitable hydrosilylation catalysts for use in the present invention are disclosed, for example, in U.S. Pat. Nos. 3,159,601 and 3,159,662; 3,220,970; 3,814,730; 3,516,946; and 4,029,629.

The hydrosilylation catalyst is preferably a platinum-containing catalyst. Preferably, the platinum-containing catalyst is a platinum complex formed by reacting chloroplatinic acid containing about 4 moles of water of hydration with tetravinylcyclotetrasiloxane in the presence of sodium bicarbonate in an ethanol solution. This catalyst is disclosed in U.S. Pat. No. 3,775,452 and is often referred to as Karstedt's catalyst.

The hydrosilylation catalyst is used in a catalytic amount, which is an amount sufficient to promote the hydrosilylation reaction. Generally, there is utilized at least about 0.1 part per million (ppm) of a platinum catalyst, and preferably in a range between about 5 parts per million and about 250 parts per million, in terms of parts of platinum metal based on the weight of total composition.

Inhibitors (E) such as acetylenic alcohols (e.g., 3,5 dimethyl-1-hexyn-3-ol and 2 methyl-3-butyn-2-ol), amines, and tetravinyltetramethylcyclotetrasiloxane and mixtures thereof can also be employed when used in an effective amount which is typically in a range between about 0.01% by weight and about 1% by weight of the total composition.

The adhesive formulation of the present invention may also contain any of the conventional extending fillers (G), reinforcing fillers (F), and mixtures thereof. The vulcanizable adhesive formulation contains reinforcing filler (F) in a range between about 0% by weight and about 50% by weight, and preferably in a range between about 10% by weight and about 30% by weight of the total composition, and extending filler (G) in a range between about 0% by weight and about 70% by weight, and preferably in a range between about 20% by weight and about 50% by weight of the total composition.

Examples of extending fillers (G) useful herein include alpha quartz, crushed quartz, aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand, carbon black, graphite, barium sulfate, zinc sulfate, wood flour, cork, fluorocarbon polymer powder and the like. Alpha quartz is the most preferred extending filler.

Examples of reinforcing fillers (F) include silica, such as fumed silica or precipitated silica, and treated silica fillers such as fumed or precipitated silica that has been reacted with, for example, an organohalosilane, a disiloxane, or a disilazane. Fumed silica is particularly effective as a reinforcing filler for the compositions of the present invention. A particularly preferred treated fumed silica is one wherein the fumed silica has been treated first with cyclic polysiloxanes, for example, dimethylcyclic tetramer, according to the methods as described in U.S. Pat. No. 2,938,009, and then treated with a silazane, for example, hexamethyldisilazane, as described in U.S. Pat. Numbers 3,635,743 and 3,847,848, so as to remove most of the free silanols on the surface of the tetramer treated silica. Removal of most of the free silanols refers to less than about 30% silanols remaining on the surface of the tetramer treated silica. Such a filler is sometimes referred to herein as "treated fumed silica".

An adhesion promoting catalyst may optionally be used with the silicone formulations to promote adhesion. Typically, the cure catalyst may be, for example, trimethoxyboroxine (TMB).

The adhesive formulation of the present invention typically is prepared by homogeneously mixing (i.e. uniformly mixing) components (B)–(G) with the adhesion promoter (A) and any optional ingredients, using suitable batch, continuous, or semi-continuous mixing means, such as a spatula, a drum roller, a mechanical stirrer, a three-roll mill, a sigma blade mixer, a bread dough mixer, or a two-roll mill.

It is possible to mix all components in one mixing step immediately prior to the intended use of the curable composition. Alternatively, certain components can be pre-mixed to form two or more packages which can be stored, if desired, and then mixed in a final step immediately prior to the intended use thereof.

Preferably, the vinyl-containing polydiorganosiloxane (B) will be homogeneously mixed with a hydrosilylation catalyst (D) and any additional reinforcing filler to form a package (1). Package (2) will be a mixture of the hydrogen-containing polysiloxane (C), at least one vinyl-containing polydiorganosiloxane, and inhibitor. Package (2) is modified with adhesion promoter, and optionally, with additional inhibitor and additional hydrogen-containing polysiloxane. Package (1) and package (2) are then homogeneously mixed. Typically, the weight ratio of package (1) to package (2) is in a range between about 15:1 and about 1:1 and preferably, in a range between about 12:1 and about 1:1. These two packages can then be stored until the composition of this invention is desired and then homogeneously mixed.

The thickness of the total composition on a substrate is typically in a range between about 1 millimeter and about 20 millimeters and more typically, in a range between about 1 millimeter and about 10 millimeters. The total composition of the present invention can be applied to the surface of a substrate by any suitable means such as rolling, spreading, spraying, and the like, and subsequently cured. After application of the total composition onto the substrate, the composition can be cured over a period in a range between about 0.25 hours and about 150 hours. Typically, the cure temperature is in a range between about 50° C. and about 150° C.

When applied to a substrate, the total composition of the present invention has the desirable property of failing cohesively instead of adhesively when tested. A lap shear adhesion strength test is commonly used to measure adhesive failure and cohesive failure. "Adhesive failure" as used herein indicates that the silicone layer separates from the substrate at the point wherein the two layers meet, that is, the bond between the silicone layer and the substrate ruptures before the silicone layer or the substrate ruptures. "Cohesive failure" as used herein indicates that the silicone layer or the substrate ruptures before the bond between the silicone layer and the substrate fails.

The vulcanizable adhesive formulation has been found to cohesively bond on polymer substrates. Polymer substrates include, but are not limited to phenolic resins, epoxy resins, polyetherimides, polyamides, unsaturated polyesters, poly (ethylene terephthalate), polycarbonates, polyphenylene sulfide, polyacetals, and polyimides. Preferably, the vulcanizable adhesive formulation is used for adhesion to polyamides. Treating the substrate may include cleaning the substrate. The compositions can be used as adhesives for applications in the military and laser industry as well as the electronic industry and automotive industry.

Vulcanizable adhesive formulations cure by mechanisms such as hydrosilylation or condensation. In order that those skilled in the art may better understand the practice of the present invention, the following examples of silicone compositions curing via hydrosilylation are given by way of illustration and not by way of limitation.

EXAMPLE 1

A silicone composition was prepared by adding 1 gram of 2,2'-diallyl bisphenol A (obtained from Aldrich) to modify 10 grams of package (2). Package (2) initially contained 47% by weight of a vinyl-terminated polydimethylsiloxane (0.06% by weight vinyl content; viscosity of 72,000–89,000 centipoise), 47.5% of a hydrogen-containing siloxane (0.8% by weight hydride content; viscosity of 40 centipoise), 3.8% by weight of methylvinyl tetramer inhibitor, and 0.1% by weight of 3,5 dimethyl-1-hexyn-3-ol. The modified package (2) was then combined with 100 grams of package (1) which contained 0.06% by weight of platinum catalyst, 40.4% of a silicone resin (1.26% by weight vinyl content; viscosity of 32,000 centipoise), 20.3% of a vinyl-terminated polydimethylsiloxane (0.06% by weight vinyl content; viscosity of 78,000 centipoise), 12% of a vinyl-terminated polydimethylsiloxane (0.17% by weight vinyl content; viscosity of 3,700 centipoise), and 27.6% silica filler. The modified package (2) and package (1) were mixed thoroughly and degassed under vacuum to provide a vulcanizable adhesive formulation. The vulcanizable adhesive formulation was applied to polyamide-6,6 (nylon) samples (one inch by four inches) with a one inch overlap. The specimens were cured as per the following table. The lap shear adhesion strength was measured on an Instron 4202 instrument with a crosshead speed of 2 inches per minutes. The results of the varying cure temperature can be seen in Table 1.

TABLE 1

| Cure Conditions | Test Results | Lap Shear Strength (psi) |
| --- | --- | --- |
| 1 hour at 60° C. | >95% cohesive failure | 345 +/− 66 |
| 1 hour at 80° C. | Cohesive | 455 +/− 89 |
| 1 hour at 100° C. | Cohesive | 531 +/− 85 |

As evident from the above-table, 2,2'-diallyl bisphenol A is an effective adhesion promoter for adhesion to nylon. Without adhesion promoter inclusion, 100% adhesive failure with lap shear strength of 3 psi was obtained.

EXAMPLE 2

The method and silicone composition of Example 1 was used with a variation of humidity and temperature. The silicone composition was cured for 1 hour at 100° C. After preparation, the samples were preconditioned for one week at 23° C./70% Relative Humidity followed by exposure to 70° C./85% Relative Humidity for the time reported in Table 2 below and finally, stored for one week at 23° C./70% Relative Humidity before testing the lap shear adhesion strength.

TABLE 2

| Time at 70° C./85% Relative Humidity (days) | Failure Mode | Lap Shear Strength (psi) |
| --- | --- | --- |
| 0 | Cohesive | 430 +/− 70 |
| 7 | Cohesive | 335 +/− 37 |
| 21 | Cohesive | 368 +/− 18 |
| 35 | Cohesive | 336 +/− 21 |

As the above table indicates, 2,2'-diallyl bisphenol A is an effective adhesion promoter when incorporated into silicone formulations. Lap shear composites with the amended formulation on nylon failed cohesively within the silicone. This test showed the hydrolytic stability of the bond between the vulcanizable adhesive formulation and the substrate.

EXAMPLE 3

The 2,2'-diallyl 4,4'-diglycidyl ether of bisphenol A was prepared in a 100 mL flask equipped with a magnetic stirrer and a condenser. 2,2'-Diallyl bisphenol A (3.3 grams, 10.7 mmol) was mixed with 1-chloro-2,3-epoxypropane (5.9 grams, 63.8 mmol), potassium carbonate (5.5 grams, 39.8 mmol) and 25 mL acetone. The reaction medium was then heated up to 60° C. and left refluxing for 96 hours. The mixture was filtered and concentrated on a rotary evaporator. The residue was dissolved in 50 mL dichloromethane and washed twice with water. The organic layer was dried over anhydrous $MgSO_4$ and vacuum concentrated to yield 4.2 grams (90%) of a yellow liquid. The composition was confirmed via proton nuclear magnetic resonance spectroscopy (NMR).

The same method and silicone formulation of Example 1 was used with the use of varying amounts of 2,2'-diallyl 4,4'-diglycidyl ether of bisphenol A and the addition of varying amounts of trimethoxyboroxine (TMB). Extra hydrogen-containing polysiloxane (SiH) was added (HMQ). Lap shear strength adhesion results can be seen in Table 3.

TABLE 3

| Adhesion promoter | | TMB | Extra SiH | Lap Shear | |
|---|---|---|---|---|---|
| Grams | % | (µL) | (grams) | Failure Mode | Strength (psi) |
| 1.5 | 4.3 | 150 | 0.75 | Cohesive | 485+/−85 |
| 0.11 | 0.33 | 50 | — | Cohesive | 475+/−37 |

These results indicate that 2,2'-diallyl 4,4'-diglycidyl ether of bisphenol A is an effective adhesion promoter when incorporated into the silicone formulations.

EXAMPLE 4

The method of Example 1 was used with 1 gram glycidyl 2-allyl phenyl ether and 500 µl trimethoxyboroxine. Lap shear specimens were made to test the adhesion of the glycidyl 2-allyl phenyl ether formulation on nylon (polyamide). The sample was cured for one hour at 100° C. The failure was cohesive, with a lap shear strength value of 554+/−72 psi.

EXAMPLE 5

The method of Example 1 was used with 3 grams 2,2-bis(3-allyl-4-hydroxyphenyl)hexafluoropropane. Lap shear specimens were made to test the adhesion of the 2,2-bis(3-allyl-4-hydroxyphenyl)hexafluoropropane formulation on nylon-6,6 (polyamide). The sample was cured for one hour at 100° C. The failure was cohesive, with a lap shear strength value of 445+/−81 psi.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A silicone composition comprising a vulcanizable adhesive formulation which comprises:

(A) at least one oxygen-substituted allyl aromatic compound having the structural formula I

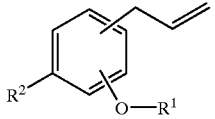

(I)

where $R_1$ is hydrogen or an epoxy functional group; $R^2$ is hydrogen or group II with the proviso that $R^1$ is an epoxy functional group when $R^2$ is hydrogen, said group II having the structural formula

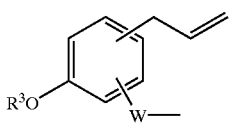

(II)

wherein $R^3$ is hydrogen or an epoxy functional group; and W is a group having the structural formula $R^6$—C—$R^7$, wherein $R^6$ and $R^7$ are independently hydrogen, a perfluoroalkyl, a $C_1$–$C_{20}$ alkyl radical, a $C_4$–$C_{20}$ cycloalkyl radical or a $C_4$–$C_{20}$ aryl radical or taken together, $R^6$ and $R^7$ form a $C_4$–$C_{20}$ cycloaliphatic ring optionally substituted by one or more $C_1$–$C_{20}$ alkyl radicals, $C_6$–$C_{20}$ aryl radicals, $C_5$–$C_{21}$ aralkyl radicals, $C_5$–$C_{20}$ cycloalkyl groups or combinations thereof;

(B) a vinyl-containing polydiorganosiloxane;
(C) a hydrogen-containing polysiloxane;
(D) a catalytic amount of a hydrosilylation catalyst; and
(E) an inhibitor.

2. The composition in accordance with claim 1, wherein the vulcanizable adhesive formulation further comprises an extending filler (F), a reinforcing filler (G), or combination thereof.

3. The composition in accordance with claim 1, wherein the vinyl-containing polydiorganosiloxane has a general formula,

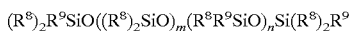

wherein $R^9$ is a vinyl radical, $R^8$ is selected from the group consisting of alkyl radicals having carbon atoms in a range of between about 1 and about 8, phenyl radicals, fluoroalkyl radicals, having carbon atoms in a range of between about 3 and about 10 and mixtures thereof, "M"+"n" has a value sufficient to provide a total polydiorganosiloxane viscosity in a range of between about 100 centipoise and about 100,000 centipose at 25° C., and a vinyl content in a range of between about 0.02% by weight and about 2.0% by weight of the vinyl-containing polydiorganosiloxane, and a vinyl-containing silicone resin copolymer present in a range of between 0% by weight and about 70% by weight, based on the total weight of the vinyl-containing polydiorganosiloxane, having $(R^{10})_3SiO_{1/2}$ units and $SiO_{4/2}$ units, wherein $R^{10}$ is a vinyl radical, or a monovalent having hydrocarbon radical free of aliphatic unsaturation and containing no more than six carbon atoms, the ratio of $(R^{10})_3SiO_{1/2}$ units to $SiO_{4/2}$ units being in a range of between about 0.5:1 and about 1.5:1, and the resin having a vinyl content in a range between of about 1.5% by weight and about 3.5% by weight of the vinyl-containing siloxane resin copolymer.

4. The composition in accordance with claim 1, wherein the vinyl-containing polydiorganosiloxane is present in a range between about 10% by weight and about 80% by weight of the total composition.

5. The composition in accordance with claim 1, wherein the hydrogen-containing polysiloxane has an average unit formula,

wherein $R^{11}$ is a hydrogen, a monovalent hydrocarbon radical, or a halogenated monovalent hydrocarbon radical having carbon atoms in a range between about 1 and about 10 and free of aliphatic unsaturation, "d" has a value in a range between 0 and about 3, "e" has a value in a range between about 1 and about 3, and the sum of "d"+"e" has a value in a range between about 1 and about 3.

6. The composition in accordance with claim 1, wherein the hydrogen-containing polysiloxane is present in a range between about 1% by weight and about 15% by weight of the total composition.

7. The composition in accordance with claim 1, wherein $R^2$ is group II; $R^1$ is hydrogen; $R^3$ is hydrogen; and $R^6$ and $R^7$ are methyl.

8. The composition in accordance with claim 1, wherein the oxygen-substituted allyl aromatic compound is present in a range between about 0.1% by weight and about 5% by weight of the total composition.

9. The composition in accordance with claim 2, wherein the reinforcing filler is present in a range between about 0% by weight and about 50% by weight of the total composition.

10. The composition in accordance with claim 2, wherein the extending filler is present in a range between about 0% by weight and about 70% by weight of the total composition.

11. An article comprising a polymer substrate treated with the composition of claim 1.

12. The article in accordance with claim 11, wherein the substrate comprises a polyamide.

13. A silicone composition comprising a vulcanizable adhesive formulation which composition comprises (A) at least one oxygen-substituted allyl aromatic compound, present in a range of between about 0.1% by weight and about 5% by weight of the total composition, said compound having the structural formula I

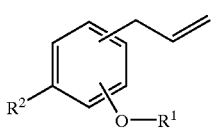

(I)

where $R_1$ is hydrogen or an epoxy functional group; $R^2$ is hydrogen or group II with the proviso that $R^1$ is an epoxy functional group when $R^2$ is hydrogen, said group II having the structural formula

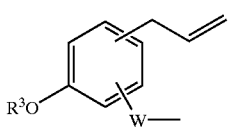

(II)

wherein $R^3$ is hydrogen or an epoxy functional group; and W is a group having the structural formula $R^6$—C—$R^7$, wherein $R^6$ and $R^7$ are independently hydrogen, a perfluoroalkyl, a $C_1$–$C_{20}$ alkyl radical, a $C_4$–$C_{20}$ cycloalkyl radical or a $C_4$–$C_{20}$ aryl radical or taken together, $R^6$ and $R^7$ form a $C_4$–$C_{20}$ cycloaliphatic ring optionally substituted by one or more $C_1$–$C_{20}$ alkyl radicals, $C_6$–$C_{20}$ aryl radicals, $C_5$–$C_{21}$ aralkyl radicals, $C_5$–$C_{20}$ cycloalkyl groups or combinations thereof;

(B) a vinyl-containing polydiorganosiloxane present in a range of between about 10% by weight and about 80% by weight of the total composition;

(C) a hydrogen-containing polydiorganosiloxane present in a range of between about 1% by weight and about 15% by weight of the total composition;

(D) a catalytic amount of a hydrosilylation catalyst;

(E) an inhibitor present in a range of between about 0.01% by weight and about 1% by weight of the total composition;

(F) a reinforcing filler present in a range of between 0% by weight and about 50% by weight of the total composition; and (G) an extending filler present in a range of between 0% by weight and about 70% by weight of the total composition.

14. An article comprising a polymer substrate treated with the composition of claim 13.

15. The article in accordance with claim 14, wherein the substrate comprises a polyamide.

16. A method to provide cohesive failure to a silicone composition and a substrate which comprises the steps of:

(I) applying a silicone composition to a substrate wherein the silicone composition comprises (A) at least one oxygen-substituted allyl aromatic compound having the structural formula I

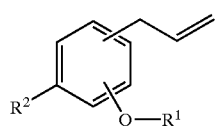

(I)

where $R_1$ is hydrogen or an epoxy functional group; $R^2$ is hydrogen or Group II with the proviso that $R^1$ is an epoxy functional group when $R^2$ is hydrogen, said Group II having the structural formula

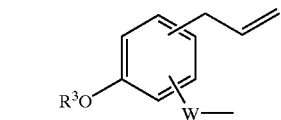

(II)

wherein $R^3$ is hydrogen or an epoxy functional group; and W is a group having the structural formula $R^6$—C—$R^7$, wherein $R^6$ and $R^7$ are independently hydrogen, a perfluoroalkyl, a $C_1$–$C_{20}$ alkyl radical, a $C_4$–$C_{20}$ cycloalkyl radical or a $C_4$–$C_{20}$ aryl radical or taken together, $R^6$ and $R^7$ form a $C_4$–$C_{20}$ cycloaliphatic ring optionally substituted by one or more $C_1$–$C_{20}$ alkyl radicals, $C_6$–$C_{20}$ aryl radicals, $C_5$–$C_{21}$ aralkyl radicals, $C_5$–$C_{20}$ cycloalkyl groups or combinations thereof;

(B) a vinyl-containing polydiorganosiloxane;

(C) a hydrogen-containing polysiloxane;

(D) a catalytic amount of a hydrosilylation catalyst; and (E) an inhibitor; and (II) curing the silicone composition.

17. The method in accordance with claim 16, wherein the silicone composition further comprises an extending filler (F), a reinforcing filler (G), or combinations thereof.

18. The method in accordance with claim 17, wherein the vinyl-containing polydiorganosiloxane has a general formula, $$(R^8)_2R^9SiO((R^8)_2SiO)_m(R^8R^9SiO)_nSi(R^8)_2R^9$$

wherein $R^9$ is a vinyl radical, $R^8$ is selected from the group consisting of alkyl radicals having carbon atoms in a range of between about 1 and about 8, phenyl radicals, fluoroalkyl radicals having carbon atoms in a range of between about 3 and about 10 and mixtures thereof, "m"+"n" has a value sufficient to provide a total vinyl-containing composition with a viscosity in a range of between about 100 centipoise and about 100,000 centipoise at 25° C., and a vinyl content in a range between of about 0.02% by weight and about 2.0% by weight of the vinyl-containing polydiorganosiloxane, and a vinyl-containing siloxane resin copolymer present in a range of between 0% by weight and about 70% by weight, based on the total weight of the vinyl-containing polydiorganosiloxane, having $(R^{10})_3SiO_{1/2}$ units and $SiO_{4/2}$ units, wherein $R^{10}$ is a vinyl radical, or a monovalent hydrocarbon radical free of aliphatic unsaturation and containing no more than six carbon atoms, the ratio of $(R^{10})_3SiO_{1/2}$ units to $SiO_{4/2}$ units being in a range of between about 0.5:1 and about 1.5:1, and the resin having a vinyl content in a range of between about 1.5% by weight and about 3.5% by weight of the vinyl-containing siloxane resin copolymer.

19. The method in accordance with claim 18, wherein the vinyl-containing polydiorganosiloxane is present in a range between about 10% by weight and about 80% by weight of the total composition.

20. The method in accordance with claim 16, wherein the hydrogen-containing polysiloxane comprises an average unit formula,

wherein $R^{11}$ is a hydrogen, a monovalent hydrocarbon radical, or a halogenated monovalent hydrocarbon radical having carbon atoms in a range between about 1 and about 10 and free of aliphatic unsaturation, "d" has a value in a range between 0 and about 3, "e" has a value in a range between about 1 and about 3, and the sum of "d"+"e" has a value in a range between about 1 and about 3.

21. The method in accordance with claim 16, wherein the hydrogen-containing polysiloxane is present in a range between about 1% by weight and about 15% by weight of the total composition.

22. The method in accordance with claim 16, wherein $R^2$ comprises Group II; $R^1$ is hydrogen; $R^3$ is hydrogen; and W is the group

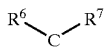

wherein $R^6$ and $R^7$ are $C_1$ alkyl radicals.

23. The method in accordance with claim 16, wherein the oxygen-substituted allyl aromatic compound is present in a range between about 0.1% by weight and about 5% by weight of the total composition.

24. The method in accordance with claim 16, wherein the substrate comprises a polymer.

25. The method in accordance with claim 24, wherein the polymer comprises a polyamide.

26. The method in accordance with claim 16, wherein the silicone composition is applied to a thickness in a range between about 1 millimeter and about 20 millimeters.

27. The method in accordance with claim 16, wherein the silicone composition is cured at a temperature in a range between about 50° C. and about 150° C. over a period in a range between about 0.25 hours and about 150 hours.

28. A method to provide cohesive failure to a silicone composition and a polyamide substrate which comprises the steps of:

(1) applying a silicone composition to a substrate to a thickness in a range between about 1 millimeter and about 20 millimeters, wherein the silicone composition comprises:
   (A) an oxygen-substituted allyl aromatic compound present in a range between about 0.1% by weight and about 5% by weight of the total composition;
   (B) a vinyl-containing polydiorganosiloxane present in a range between about 10% by weight and about 80% by weight of the total composition,
   (C) a hydrogen-containing polysiloxane in a range between about 1% by weight and about 15% by weight of the total composition,
   (D) a catalytic amount of a hydrosilylation catalyst,
   (E) an inhibitor in a range between about 0.01% by weight and about 1% by weight of the total composition,
   (F) an extending filler in a range between about 0% by weight and about 50% by weight of the total composition,
   (G) a reinforcing filler in a range between about 0% by weight and about 70% by weight of the total composition, and (2) curing the silicone composition at a temperature in a range between about 50° C. and about 150° C. over a period in a range between about 0.25 hours and about 150 hours.

* * * * *